(12) United States Patent
Kang et al.

(10) Patent No.: US 12,278,355 B2
(45) Date of Patent: Apr. 15, 2025

(54) BATTERY MODULE AND BATTERY PACK INCLUDING THE SAME

(71) Applicant: LG Energy Solution, Ltd., Seoul (KR)

(72) Inventors: Dahoon Kang, Daejeon (KR); Junyeob Seong, Daejeon (KR); Jae Hyeon Ju, Daejeon (KR); Jisu Yoon, Daejeon (KR); Kyoungho Seo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 689 days.

(21) Appl. No.: 17/439,545

(22) PCT Filed: Jul. 6, 2020

(86) PCT No.: PCT/KR2020/008793
§ 371 (c)(1),
(2) Date: Sep. 15, 2021

(87) PCT Pub. No.: WO2021/096020
PCT Pub. Date: May 20, 2021

(65) Prior Publication Data
US 2022/0158271 A1    May 19, 2022

(30) Foreign Application Priority Data
Nov. 13, 2019    (KR) ................ 10-2019-0145142

(51) Int. Cl.
*H01M 10/653* (2014.01)
*H01M 10/655* (2014.01)
*H01M 50/204* (2021.01)
(52) U.S. Cl.
CPC ........ *H01M 10/653* (2015.04); *H01M 10/655* (2015.04); *H01M 50/204* (2021.01); *H01M 2220/20* (2013.01)

(58) Field of Classification Search
CPC ............ H01M 10/653; H01M 10/655; H01M 50/204; H01M 2220/20; H01M 50/271;
(Continued)

(56) References Cited

U.S. PATENT DOCUMENTS 9,236,593 B2    1/2016    Chuang et al.
2003/0215702 A1    11/2003    Tanjou et al.
(Continued)

FOREIGN PATENT DOCUMENTS

CN    102272976 A    12/2011
CN    103682191 A    3/2014
(Continued)

OTHER PUBLICATIONS

Machine English translation of KR 10-2019-0105731 (Year: 2019).*
(Continued)

*Primary Examiner* — Michael L Dignan
(74) *Attorney, Agent, or Firm* — Lerner David LLP

(57) ABSTRACT

A battery module according to an embodiment of the present disclosure may include: a battery cell stack having a plurality of battery cells stacked in a stacking direction; a module frame accommodating the battery cell stack; a thermally conductive resin layer located between a lower surface of the module frame and the battery cell stack; and a first adhesive layer located between adjacent battery cells, among the plurality of battery cells, and a liquid injection hole for injecting the thermally conductive resin layer may be formed on the lower surface of the module frame and the first adhesive layer is formed adjacent to the thermally conductive resin layer.

7 Claims, 6 Drawing Sheets

(58) Field of Classification Search
CPC ............ H01M 50/507; H01M 50/293; H01M 50/211; H01M 50/244; H01M 10/613; H01M 10/625; H01M 10/6551; H01M 50/249; H01M 50/258; H01M 50/20; H01M 50/24; Y02E 60/10

See application file for complete search history.

(56) References Cited

U.S. PATENT DOCUMENTS

| | | |
|---|---|---|
| 2007/0224498 A1 | 9/2007 | Kim et al. |
| 2012/0028084 A1 | 2/2012 | Park et al. |
| 2014/0065455 A1 | 3/2014 | Chuang et al. |
| 2015/0303425 A1 | 10/2015 | Kong |
| 2016/0126514 A1 | 5/2016 | Suzuki et al. |
| 2018/0076493 A1 | 3/2018 | Park et al. |
| 2018/0086472 A1 | 3/2018 | Gore |
| 2018/0108881 A1 | 4/2018 | Jin et al. |
| 2018/0294535 A1 | 10/2018 | Choi et al. |
| 2018/0358592 A1* | 12/2018 | Park .................. C08K 5/49 |
| 2018/0375077 A1 | 12/2018 | Shin et al. |
| 2019/0051954 A1 | 2/2019 | Kim et al. |
| 2019/0067656 A1 | 2/2019 | Zhang et al. |
| 2019/0198952 A1 | 6/2019 | Choi et al. |
| 2020/0067040 A1* | 2/2020 | Kim .................. H01M 50/211 |
| 2020/0176745 A1 | 6/2020 | Lee |
| 2020/0343607 A1 | 10/2020 | Kim et al. |
| 2020/0411924 A1 | 12/2020 | Yun |

FOREIGN PATENT DOCUMENTS

| | | | |
|---|---|---|---|
| CN | 107431147 A | 12/2017 | |
| CN | 108475831 A | 8/2018 | |
| CN | 108780934 A | 11/2018 | |
| CN | 109428020 A | 3/2019 | |
| CN | 109994798 A | 7/2019 | |
| EP | 3419103 A1 | 12/2018 | |
| JP | H11086900 A | 3/1999 | |
| JP | 2004111098 A | 4/2004 | |
| JP | 2006228714 A | 8/2006 | |
| JP | 2014093242 A | 5/2014 | |
| JP | 2018510463 A | 4/2018 | |
| KR | 20110000003 A | 1/2011 | |
| KR | 20170021122 A | 2/2017 | |
| KR | 20170043933 A | 4/2017 | |
| KR | 20170135479 A | 12/2017 | |
| KR | 20180071800 A | 6/2018 | |
| KR | 20180084539 A | 7/2018 | |
| KR | 20180138027 A | 12/2018 | |
| KR | 20190092835 A | 8/2019 | |
| KR | 10-2019-0105731 * | 9/2019 | .......... H01M 10/655 |
| KR | 20190105731 A | 9/2019 | |
| WO | 2014203342 A1 | 12/2014 | |
| WO | 2017139826 A1 | 8/2017 | |
| WO | WO 2017-171509 * | 10/2017 | .............. H01M 2/10 |
| WO | 2019098491 A1 | 5/2019 | |
| WO | 2019177275 A1 | 9/2019 | |

OTHER PUBLICATIONS

Search Report dated Nov. 28, 2022 from the Office Action for Chinese Application No. 202080028622.9 issued Dec. 5, 2022, 4 pages. [See p. 2-3, categorizing the cited references].
International Search Report for Application No. PCT/KR2020/008793 on Oct. 29, 2020, 3 pages.
Extended European Search Report including Written Opinion for Application No. 20887663.1 dated May 11, 2022, pp. 1-9.

* cited by examiner

【FIG. 1】
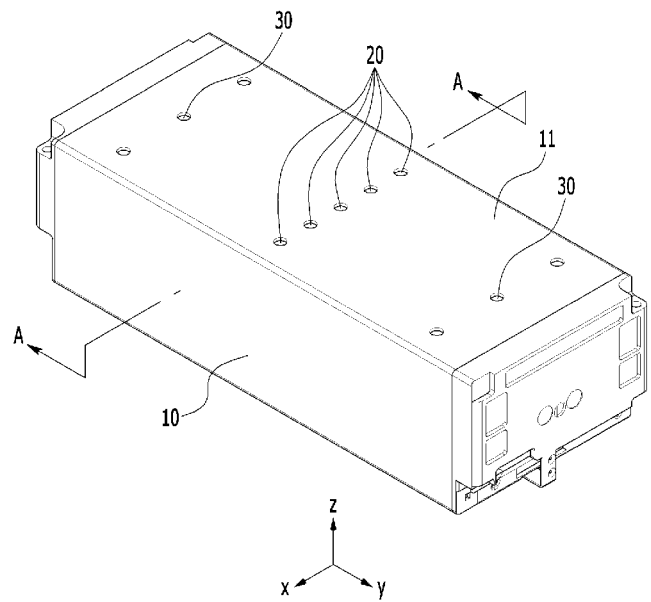
PRIOR ART
【FIG. 2】
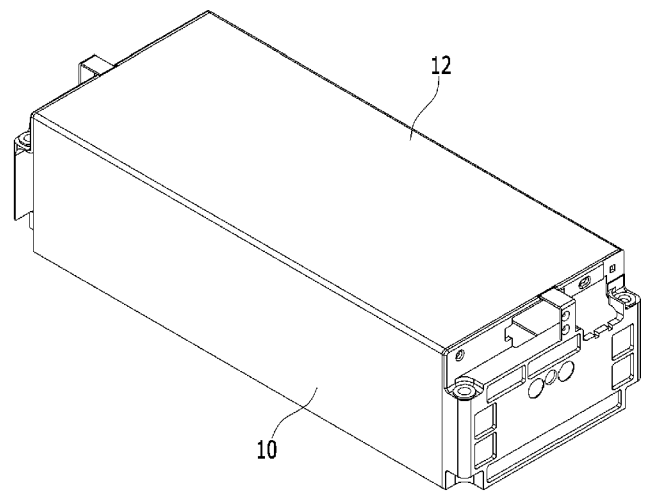
PRIOR ART

[FIG. 3]
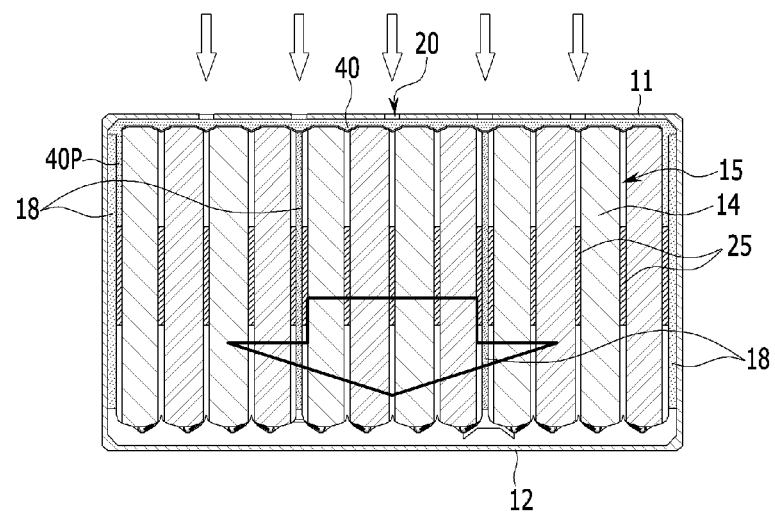
PRIOR ART
[FIG. 4]
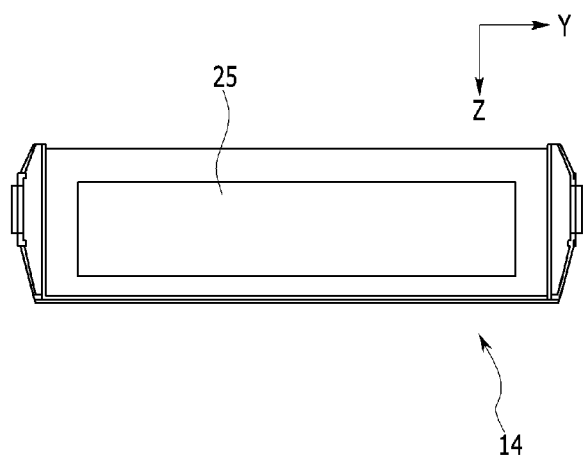
PRIOR ART

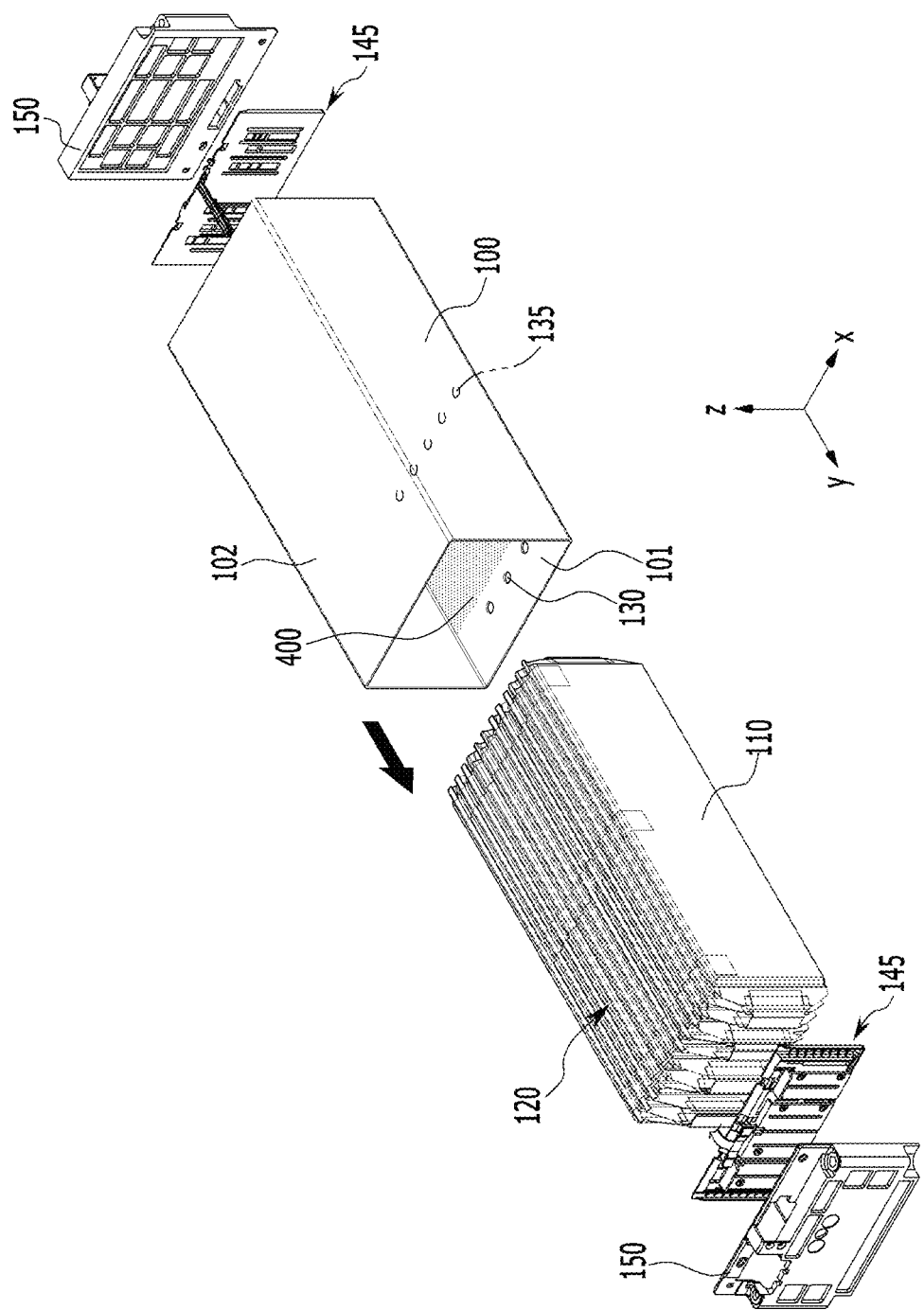
[FIG. 5]

[FIG. 6]
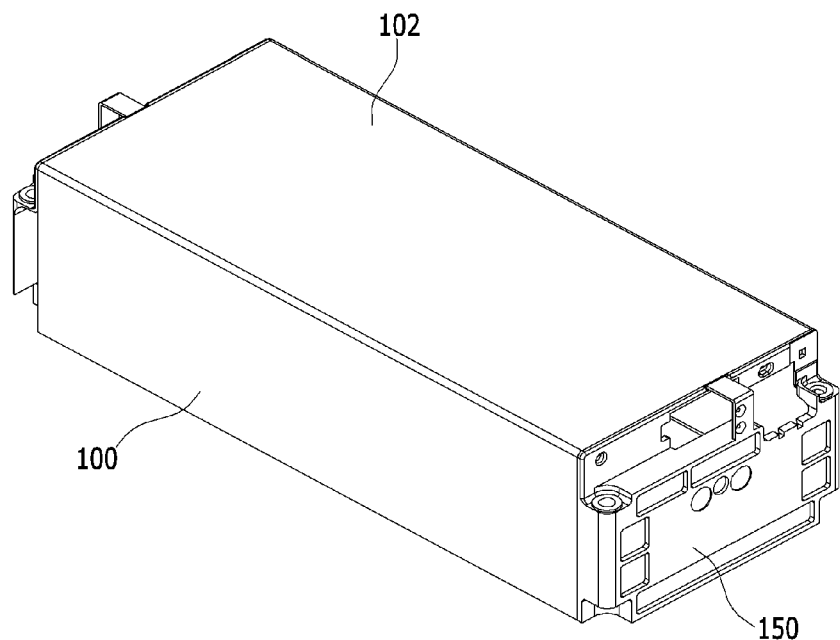
[FIG. 7]
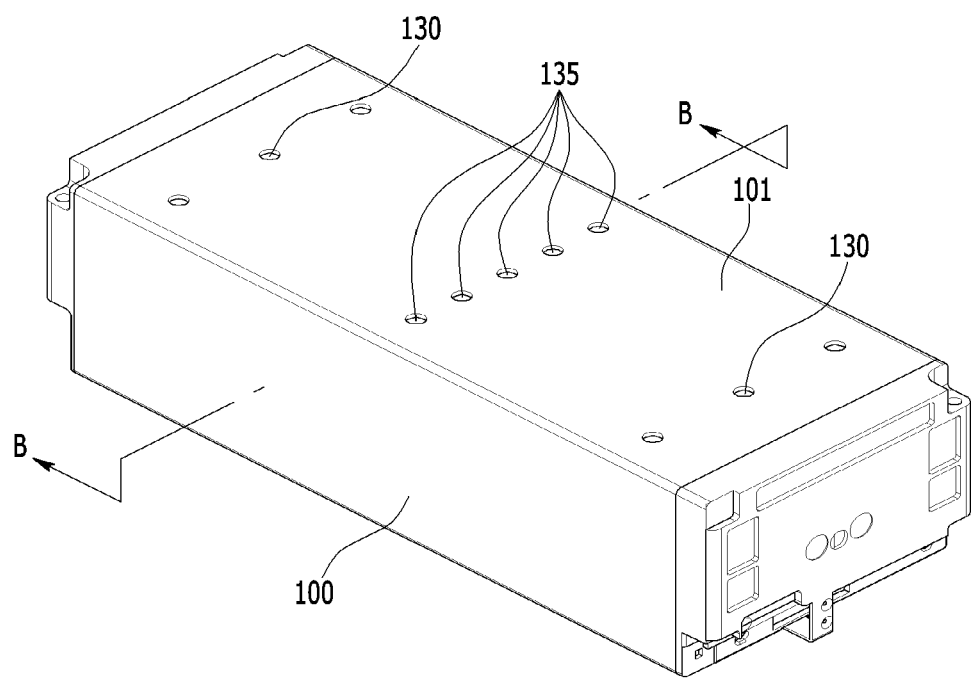

[FIG. 8]
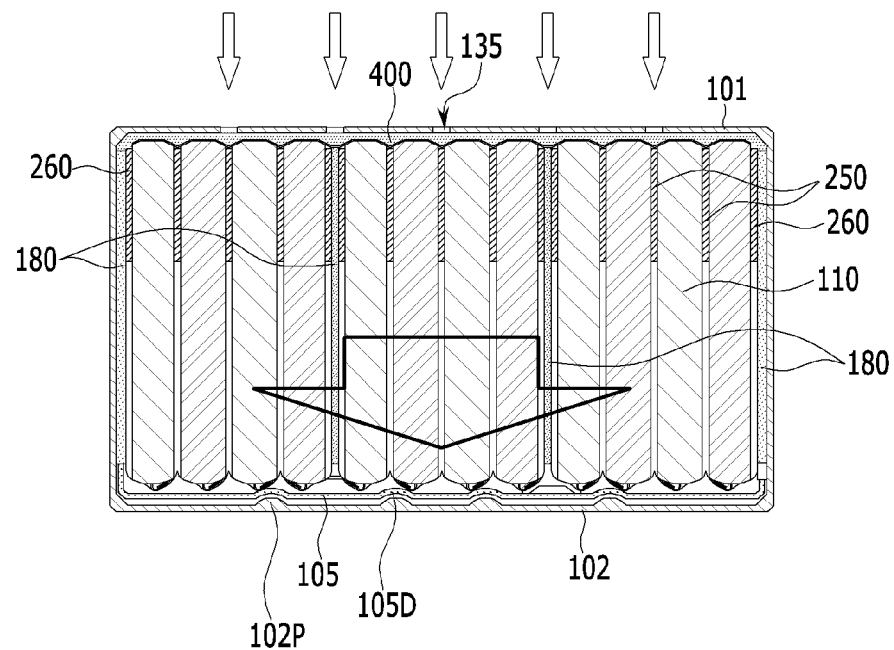
[FIG. 9]
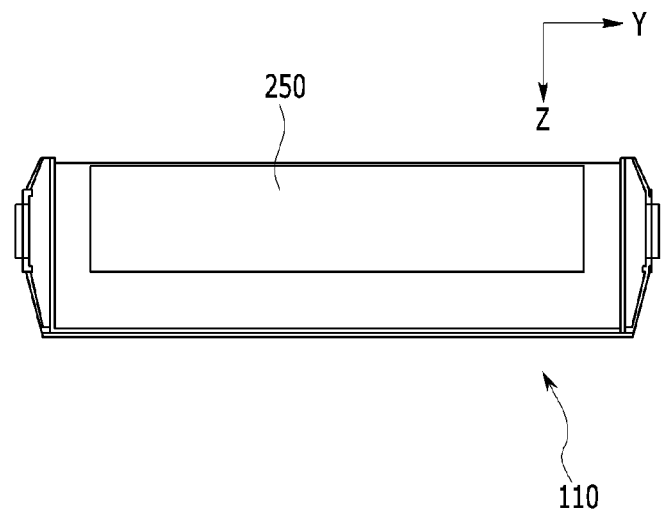

[FIG. 10]
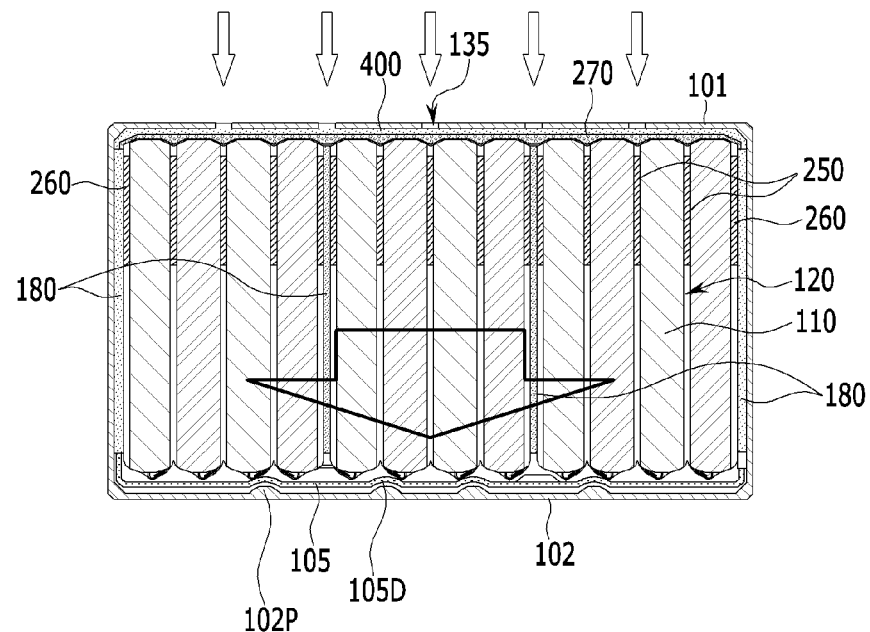
[FIG. 11]
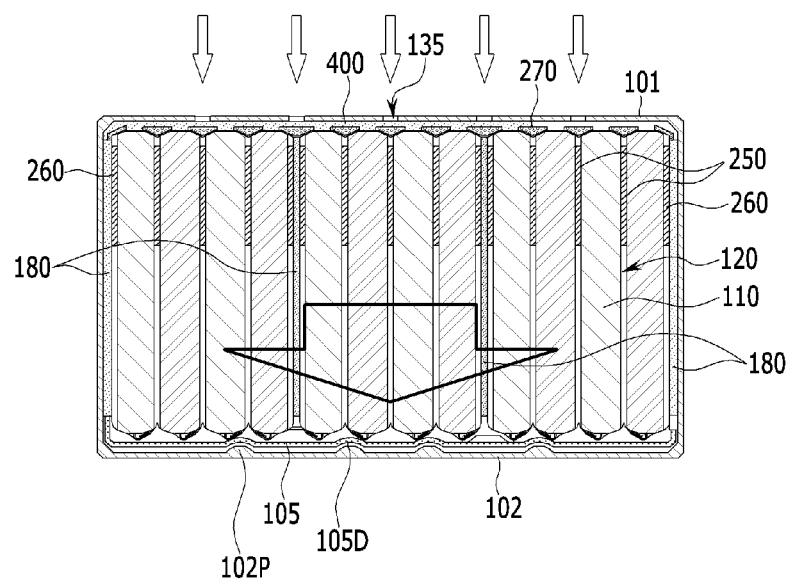

BATTERY MODULE AND BATTERY PACK INCLUDING THE SAME

CROSS-REFERENCE TO RELATED APPLICATIONS

This application is a national phase entry of 35 U.S.C. § 371 of PCT/KR2020/008793 filed Jul. 6, 2020 and claims the benefit of Korean Patent Application No. 10-2019-0145142 filed on Nov. 13, 2019 with the Korean Intellectual Property Office, the disclosures of which are each incorporated herein by reference in their entirety.

TECHNICAL FIELD

The present disclosure relates to a battery module and a battery pack including the same, and more particularly, to a battery module that prevents a thermally conductive resin from being additionally injected, and a battery pack including the same.

BACKGROUND ART

Secondary batteries, which are easily applied to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

In small-sized mobile devices, one or several battery cells are used per device, while in middle- or large-sized devices such as vehicles, a middle- or large-sized battery pack in which a large number of battery cells are electrically connected is used due to necessity of high output and large capacity.

Preferably, the middle- or large-sized battery module is manufactured so as to have as small a size and weight as possible. Consequently, a prismatic battery or a pouch-shaped battery, which can be stacked with high integration and has a small weight to capacity ratio, is usually used as a battery cell of the middle- or large-sized battery module.

FIG. 1 is a perspective view illustrating holes formed on a bottom part of a frame in a battery module according to the related art. FIG. 2 is a perspective view illustrating a state in which the battery module of FIG. 1 is turned over upwards and downwards. FIG. 3 is a cross-sectional view taken along line A-A of FIG. 1. FIG. 4 is a plan view illustrating one battery cell included in FIG. 3.

Referring to FIGS. 1 to 3, in order to protect the battery cell stack 15 from an external impact, heat, or vibration, the battery module may include a module frame 10, of which a front surface and a rear surface are opened so as to accommodate a battery cell stack 15 in an interior space of the module frame 10. The module frame 10 has an upper end part 12 and a bottom part 11. Referring to FIG. 1 illustrating a state, in which the battery module of FIG. 2 is turned over upwards and downwards, liquid injection holes 20 are formed in the bottom part 11 of the module frame 10.

The battery cell stack 15, which is an assembly formed by stacking a plurality of battery cells 14, is mounted in the interior of the battery module, and a compression pad 18 is formed between the outermost battery cell 14 and the module frame 10 and between adjacent battery cells 14. In this case, double-sided tapes 25 are attached between the adjacent battery cells 14 and/or between the battery cells 14 and the compression pad 18. The double-side tapes 25 are located at central portions of the battery cells 14, as illustrated in FIG. 4.

A thermally conductive resin may be injected between the battery cell stack 15 and the module frame 10 through the liquid injection holes 20, and may form a thermally conductive resin layer 40 as illustrated in FIG. 3.

The thermally conductive resin layer 40 may serve to transfer heat generated from the battery cell stack 15 to the outside of the battery module, and to fix the battery cell stack 15 in the interior of the battery module. Checking holes 30 may be further formed in the bottom part 11 of the module frame 10, and the thermally conductive resin, which is injected more than necessary when the thermally conductive resin is injected, may be discharged to the outside of the battery module through the checking holes 30, through which the amount of the injected thermally conductive resin may be confirmed.

FIGS. 1 and 3 illustrate a state, in which the battery module is turned over by 180 degrees in order to inject the thermally conductive resin, and in this state, if the thermally conductive resin is injected through the liquid injection holes 20, the thermally conductive resin may permeate into a space of the battery module except for the attachment part of the double-sided tape 25, along the arrow direction. As illustrated in FIG. 3, the thermally conductive resin layer 40 includes dummy resin layers 40P, and the dummy resin layers 40P may allow the amount of the thermally conductive resin that fills the space between the bottom part 11 of the module frame and the battery cell stack 15 to increase more than necessary.

DETAILED DESCRIPTION OF THE INVENTION

Technical Problem

The present disclosure has been devised to solve that above-mentioned problems, and an object of the present disclosure is to provide a battery module that prevents a thermally conductive resin from being additionally injected, a method for manufacturing the same, and a battery pack including the battery module.

However, the problem to be solved by embodiments of the present disclosure is not limited to the above-described problems, and can be variously expanded within the scope of the technical idea included in the present disclosure.

Technical Solution

A battery module according to an embodiment of the present disclosure may include: a battery cell stack having a plurality of battery cells stacked in a stacking direction; a module frame accommodating the battery cell stack; a thermally conductive resin layer located between a lower surface of the module frame and the battery cell stack; and a first adhesive layer located between adjacent battery cells, among the plurality of battery cells, and a liquid injection hole for injecting the thermally conductive resin layer may be formed on the lower surface of the module frame, and the first adhesive layer may be formed adjacent to the thermally conductive resin layer.

The battery module may further include: a compression pad located between a side surface of the module frame and an outermost battery cell of the battery cell stack; and a second adhesive layer located between the outermost battery cell and the compression pad, and the second adhesive layer may be formed adjacent to the thermally conductive resin layer.

At least one of the first adhesive layer and the second adhesive layer may make contact with the thermally conductive resin layer.

The first adhesive layer and the second adhesive layer may be double-sided tapes.

The battery module may further include a blocking film located between the battery cell stack and the thermally conductive resin layer.

The blocking film may cover the first adhesive layer and the second adhesive layer.

The blocking film may include a plurality of blocking parts, and the blocking parts are separated from each other.

The battery module may further include: a busbar frame covering front and rear surfaces of the module frame, and the module frame may cover upper, lower, left, and right surfaces of the battery cell stack.

The upper surface and the lower surface of the module frame may face each other along a direction that is perpendicular to the stacking direction of the battery cell stack.

A battery pack according to another embodiment of the present disclosure may include the above-described battery module.

Advantageous Effects

According to the embodiments, the attachment locations of the adhesive layers can be adjusted to prevent the thermally conductive resin from permeating between the compression pad and the battery cell, thereby preventing a cost increase due to additional injection of the thermally conductive resin and reducing the weight of the battery module.

BRIEF DESCRIPTION OF THE DRAWINGS

FIG. 1 is a perspective view illustrating holes formed on a bottom part of a frame in a battery module according to the related art;

FIG. 2 is a perspective view illustrating a state, in which the battery module of FIG. 1 is turned over upwards and downwards;

FIG. 3 is a cross-sectional view taken along line A-A of FIG. 1;

FIG. 4 is a plan view illustrating one battery cell included in FIG. 3;

FIG. 5 is an exploded perspective view of a battery module according to an embodiment of the present disclosure;

FIG. 6 is a view illustrating a state, in which constitutional elements of the battery module of FIG. 5 are coupled to each other;

FIG. 7 is a perspective view illustrating a state, in which the battery module of FIG. 6 is turned over upwards and downwards;

FIG. 8 is a cross-sectional view taken along line B-B' of FIG. 7;

FIG. 9 is a plan view illustrating one battery cell included in FIG. 8;

FIG. 10 is a cross-sectional view of a battery module according to another embodiment of the present disclosure; and FIG. 11 is a cross-sectional view illustrating a modified example of a blocking film of FIG. 10.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

FIG. 5 is an exploded perspective view of a battery module according to an embodiment of the present disclosure. FIG. 6 is a view illustrating a state, in which constitutional elements of the battery module of FIG. 5 are coupled to each other. FIG. 7 is a perspective view illustrating a state, in which the battery module of FIG. 6 is turned over upwards and downwards. FIG. 8 is a cross-sectional view taken along line B-B' of FIG. 7. FIG. 9 is a plan view illustrating one battery cell included in FIG. 8.

Referring to FIGS. 5 and 6, the battery module according to the present embodiment includes a battery cell stack 120, in which a plurality of battery cells 110 are stacked, and a module frame 100 accommodating the battery cell stack 120 and having a lower surface 101 and an upper surface 102, which correspond to each other, and liquid injection holes 135 for injecting a thermally conductive resin and/or checking holes 130 are formed on the lower surface 101 of the module frame 100.

The module frame 100 according to the present embodiment surrounds remaining outer surfaces except for the front surface and the rear surface of the battery cell stack 120, end plates 150 are located on the front surface and the rear surface of the battery cell stack 120, respectively, and busbar frames 145 are located between the battery cell stack 120 and the end plates 150. The remaining surfaces except for the front surface and the rear surface of the battery cell stack 120, may be upper, lower, left, and right surfaces of the battery cell stack 120. The upper surface 102 and the lower surface 101 of the module frame 100 may face each other along a direction perpendicular to a stack direction of the battery cell stack 120. The stack direction of the battery cell stack 120 may be the x-axis direction of FIG. 5, and the direction perpendicular to the stack direction may be the z-axis direction.

Referring to FIGS. 5 and 7, a thermally conductive resin layer 400 is located between the lower surface 101 of the module frame 100 and the battery cell stack 120 according to the present embodiment. The thermally conductive resin layer 400 may be formed by curing a thermally conductive resin injected through the liquid injection hole 135, and may serve to transfer heat generated in the battery cell stack 120 to the outside of the battery module, and to fix the battery cell stack 120 in the interior of the battery module.

Referring to FIGS. 7 and 8, the battery module according to the present embodiment may further include an insulation cover 105 located between the upper surface 102 of the module frame 100 and the battery cell stack 120. The insulation cover 105 may be formed of a plastic injection-molded material. A guide member 105D extending in a bar shape may be formed on an outer surface of the insulation cover 105. The guide member 105D may protrude in a direction, in which the battery cell stack 120 is located, and may function to guide the location of the battery cell stack 120 when the battery cell stack 120 is inserted into the module frame 100.

Referring to FIG. 8, the battery module according to the present embodiment may further include a compression pad 180 located between the battery cells 110 located on the outermost side 110 and side surface part of the module frame 100. The compression pad 180 may be formed of a polyurethane-based material. The compression pad 180 may alleviate deformation of the thicknesses of the battery cell 110 due to swelling and changes of the battery cell 110 due to an external impact. At least one compression pad 180 may be formed between the adjacent battery cells 110, as well as between the outermost battery cell 110 and the side surface part of the module frame 100.

According to the present embodiment, a first adhesive layer 250 may be formed between the adjacent battery cells, among the plurality of battery cells 110. The first adhesive layer 250 may be a double-sided tape. The first adhesive layer 250 may be formed adjacent to the thermally conductive resin layer 400. Preferably, the first adhesive layer 250 may be formed at ends of the space part formed between the adjacent battery cells. Here, the first adhesive layer 250 may make contact with the thermally conductive resin layer 400.

In a modified embodiment, as illustrated in FIG. 8, an upper surface 102 of the module frame 100 may include convex portions 102P. The convex portions 102P may have a structure protruding from the upper surface 102 of the module frame 100, and may be integrally formed with the upper surface 102 of the module frame 100. The convex portions 102P are formed at portions corresponding to the above-described guide members 105D, and can prevent a cell block from being flowing in right and left directions and can prevent the cell block from being one-sided due to the gravitational force. Then, the directions, in which the convex portion 102P and the guide member 105D protrude, may be the same, and the protrusion direction may be a direction opposite to the direction of the gravitational force. The cell block may be a structure, in which the busbar frame 145 of FIG. 5 is coupled to the battery cell stack 120.

The battery module according to the present embodiment may further include second adhesive layer 260 located between the battery cell 110 located on the outermost sides of the battery cell stack 120 and the compression pad 180. The second adhesive layer 260 may be formed adjacent to the thermally conductive resin layer 400. The second adhesive layer 260 may be a double-sided tape. Preferably, the second adhesive layer 260 may be formed at ends of the space part formed between the adjacent battery cells. Here, the end of the space part may be close to locations, at which the liquid injection holes 135 are formed. When viewed from sides of the battery cell 110, as illustrated in FIG. 9, the first adhesive layer 250 may be formed to be biased to sides of the battery cell 110. Then, the second adhesive layer 260 may make contact with the thermally conductive resin layer 400.

As described above, according to the present embodiment, the attachment locations of the first and second adhesive layer 250 and 260 can be adjusted to prevent the thermally conductive resin from permeating between the adjacent battery cells and/or between the compression pad 180 and the outermost battery cell 110, thereby preventing a cost increase due to additional injection of the thermally conductive resin and reducing the weight of the battery module.

FIG. 10 is a cross-sectional view of a battery module according to another embodiment of the present disclosure.

Referring to FIG. 10, the battery module according to the present embodiment may further include a blocking film 270 located between the battery cell stack 120 and the thermally conductive resin layer 400. The blocking film 270 may be formed of a polymer film, and, for example, may be formed of a polyethylene terephthalate (PET) film. The blocking film 270 according to the present embodiment may cover the first adhesive layer 250 and the second adhesive layer 260. That is, as illustrated in FIG. 10, the blocking film 270 is a structure that extends long in a transverse direction between the battery cell stack 120 and the thermally conductive resin layer 400, and may extend to the compression pad 180 located at opposite peripheries of the module frame 100.

As in the present embodiment, when the blocking film 270 is formed, the thermally conductive resin can be prevented from permeating between the adjacent battery cells and/or between the compression pad 180 and the outermost battery cell 110, by the blocking film 270. Accordingly, the degree of freedom of the formation locations of the first and second adhesive layers 250 and 260 can be increased. For example, as illustrated in FIG. 10, at least one group of the first adhesive layer 250 and the second adhesive layer 260 may be formed to be slightly spaced apart from the blocking film 270, and unlike this, at least one group of the first adhesive layer 250 and the second adhesive layer 260 may make contact with the blocking film 270. Further, at least one of the first adhesive layer 250 and the second adhesive layer 260 may be located at central portions of the battery cell 110.

All the contents described in the embodiment of FIG. 8, other than the above-described differences, may be applied to the present embodiment.

FIG. 11 is a cross-sectional view illustrating a modified example of a blocking film of FIG. 10.

Referring to FIG. 11, similarly to the embodiment of FIG. 10, a blocking film 270 may be located between the battery cell stack 120 and the thermally conductive resin layer 400. However, the blocking film 270 according to the present embodiment is not formed to continuously cover the first adhesive layer 250 and the second adhesive layer 260, but includes a plurality of blocking parts, and the blocking parts are separated from each other. In other words, as illustrated in FIG. 11, the blocking parts 270 may cover only the space part between the adjacent battery cell and the portion adjacent to the space part, and similarly, may cover the space part between the compression part 180 and the outermost battery cell 110 and the portion adjacent to the space part.

All the contents described in the embodiment of FIG. 10, other than the above-described differences, may be applied to the present embodiment.

Meanwhile, one or more battery modules according to an embodiment of the present disclosure can be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto but can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: module frame
120: battery cell stack
135: liquid injection hole
250, 260: adhesive layers
270: blocking film
400: thermally conductive resin layer

The invention claimed is:

1. A battery module comprising:
    a battery cell stack having a plurality of battery cells stacked in a stacking direction;
    a module frame accommodating the battery cell stack;
    a thermally conductive resin layer located between a lower surface of the module frame and the battery cell stack;
    a first adhesive layer located between adjacent battery cells, among the plurality of battery cells;
    a compression pad located between a side surface of the module frame and an outermost battery cell of the battery cell stack;
    a second adhesive layer located between the outermost battery cell and the compression pad; and
    a blocking film located between the battery cell stack and the thermally conductive resin layer,
    wherein the second adhesive layer is formed offset from a central part of the battery cell stack and adjacent to the thermally conductive resin layer, wherein a liquid injection hole for injecting the thermally conductive resin layer is formed on the lower surface of the module frame, and the first adhesive layer is formed offset from the central part of the battery cell stack and adjacent to the thermally conductive resin layer.

2. The battery module of claim 1, wherein the first adhesive layer and the second adhesive layer are double-sided tapes.

3. The battery module of claim 1, wherein the blocking film covers the first adhesive layer and the second adhesive layer.

4. The battery module of claim 1, wherein the blocking film comprises a plurality of blocking parts, and the blocking parts are separated from each other.

5. The battery module of claim 1, further comprising:
    a busbar frame covering front and rear surfaces of the module frame,
    wherein the module frame covers upper, lower, left, and right surfaces of the battery cell stack.

6. The battery module of claim 1, wherein an upper surface and a lower surface of the module frame face each other along a direction that is perpendicular to the stacking direction of the battery cell stack.

7. A battery pack comprising the battery module of claim 1.

* * * * *